United States Patent
Johnson et al.

(10) Patent No.: US 9,709,271 B2
(45) Date of Patent: Jul. 18, 2017

(54) THERMALLY CONTROLLED COMBUSTION SYSTEM

(71) Applicant: Fluor Technologies Corporation, Aliso Viejo, CA (US)

(72) Inventors: Dennis W. Johnson, Simpsonville, SC (US); James H. Brown, Simpsonville, SC (US); Bo Oscarsson, Flat Rock, NC (US); Jon Peeples, Taylors, SC (US); Dennis Malone, Simpsonville, SC (US); Randy Grantz, Anderson, SC (US)

(73) Assignee: Fluor Technologies Corporation, Sugar Land, TX (US)

( * ) Notice: Subject to any disclaimer, the term of this patent is extended or adjusted under 35 U.S.C. 154(b) by 571 days.

(21) Appl. No.: 13/772,125

(22) Filed: Feb. 20, 2013

(65) Prior Publication Data

US 2014/0234788 A1   Aug. 21, 2014

(51) Int. Cl.
*F23N 1/08* (2006.01)
*F23J 15/00* (2006.01)
*F23L 7/00* (2006.01)

(52) U.S. Cl.
CPC ................ *F23N 1/08* (2013.01); *F23J 15/00* (2013.01); *F23L 7/002* (2013.01); *F23L 7/007* (2013.01); *Y02E 20/344* (2013.01)

(58) Field of Classification Search
CPC ............ F23N 1/022; F23N 1/08; F23L 7/007
See application file for complete search history.

(56) References Cited

U.S. PATENT DOCUMENTS

| | | | |
|---|---|---|---|
| 4,498,298 A | 2/1985 | Morgan | |
| 4,895,710 A * | 1/1990 | Hartmann et al. | 423/351 |
| 5,261,602 A * | 11/1993 | Brent | C01B 3/363 110/347 |
| 5,517,818 A * | 5/1996 | Leithner | 60/39.464 |
| 5,694,761 A | 12/1997 | Griffin, Jr. | |
| 5,743,080 A | 4/1998 | Ginter | |
| 5,956,937 A | 9/1999 | Beichel | |
| 6,148,602 A | 11/2000 | Demetri | |

(Continued)

FOREIGN PATENT DOCUMENTS

| | | |
|---|---|---|
| WO | 2007/098239 | 8/2007 |
| WO | 2008/097295 | 8/2008 |
| WO | 2010/036842 | 4/2010 |

OTHER PUBLICATIONS

Bolland, O. et al., "New Concepts for Natural Gas Fired Power Plants which Simplify the Recovery of Carbon Dioxide", Energy Conversion and Management, 1992, vol. 33, No. 5-8, pp. 467-475.

(Continued)

*Primary Examiner* — Steven B McAllister
*Assistant Examiner* — Rabeeul Zuberi
(74) *Attorney, Agent, or Firm* — Conley Rose, P.C.; Kristin Jordan Harkins (57) ABSTRACT

Contemplated configurations and methods are presented for effectively controlling the temperature in an oxy-fuel combustion system. Contemplated systems preferably introduce water independent of the fuel and oxygen into the combustion chamber. Water is injected through one or more nozzles, wherein water is atomized or sprayed, creating boundary layer cool zones in a boiler system and wherein water is recovered.

12 Claims, 4 Drawing Sheets

(56) References Cited

U.S. PATENT DOCUMENTS

| | | | |
|---|---|---|---|
| 6,206,684 | B1 | 3/2001 | Mueggenburg |
| 6,234,787 | B1* | 5/2001 | Endoh ............... F23G 7/065 |
| | | | 110/238 |
| 6,508,998 | B1* | 1/2003 | Nasato ................. 423/573.1 |
| 6,662,547 | B2 | 12/2003 | Mandai et al. |
| 7,788,897 | B2 | 9/2010 | Campbell et al. |
| 2003/0131582 | A1 | 7/2003 | Anderson et al. |
| 2003/0233830 | A1 | 12/2003 | Marin et al. |
| 2004/0093796 | A1* | 5/2004 | Iijima ............. B01D 53/1475 |
| | | | 48/198.3 |
| 2005/0135984 | A1 | 6/2005 | Ferron et al. |
| 2006/0032228 | A1* | 2/2006 | Marin et al. ................ 60/730 |
| 2008/0115500 | A1* | 5/2008 | MacAdam et al. .......... 60/772 |
| 2008/0184880 | A1* | 8/2008 | Fan .................. B01D 53/002 |
| | | | 95/40 |
| 2009/0194996 | A1 | 8/2009 | Haase |
| 2010/0233055 | A1* | 9/2010 | Gatton, Jr. ............ B01D 53/83 |
| | | | 423/244.07 |
| 2011/0083435 | A1* | 4/2011 | Palmer ................... F23D 1/00 |
| | | | 60/650 |
| 2011/0129408 | A1* | 6/2011 | Jadhav .................. F23C 99/00 |
| | | | 423/437.1 |
| 2012/0073261 | A1 | 3/2012 | Palmer et al. |

OTHER PUBLICATIONS

U.S. Department of Energy, "Oxy-Fuel Combustion", Aug. 2008.
PCT Application No. PCT/US2013/026937, International Search Report, mailed Nov. 8, 2013, 4 pages.
PCT Application No. PCT/US2013/026937, Written Opinion of the International Searching Authority, mailed Nov. 8, 2013, 4 pages.
PCT Application No. PCT/US2013/026937, International Preliminary Report on Patentability, mailed Aug. 25, 2015, 5 pages.

* cited by examiner

THERMALLY CONTROLLED COMBUSTION SYSTEM

FIELD OF THE INVENTION

The field of the invention is directed to a thermally controlled combustion system, and especially relating to methods to control flame temperature in a boiler system. More particularly, this invention relates to oxy-fuel combustion systems which use solid, gaseous, or water-based fuels.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

$CO_2$ capture is an important developmental area for power generation. There are pending regulations for the control of greenhouse gases (GHG) and there are significant activities in developing $CO_2$ capture technologies. One particular area of focus is to combust coal or gas with a rich stream of oxygen. This process, known as oxy-fuel or oxy-firing, results in producing a gas mixture of substantially pure steam and $CO_2$. U.S. Pat. Nos. 5,956,937 and 6,206,684 describe exemplary oxy-fuel combustion power systems in detail. These and all other publications cited are incorporated by reference herein. Where a definition or use of a term in an incorporated reference is inconsistent or contrary to the definition of that term provided herein, the definition of that term provided herein applies and the definition of that term in the reference does not apply.

One problematic area for conventional oxy-fuel systems is that the flame temperature, the temperature of combustion products which is in the range of 2,000° F. (1,093° C.) to 5,000° F. (2,760° C.), is too hot for most materials of construction. Thus, there is a need for reducing this flame temperature. Conventional methods use recycled $CO_2$ to reduce the flame temperature, which involves a large recycle loop, requiring large equipment and adding another process for handling $CO_2$. For example, U.S. Pat. No. 4,498,298 utilizes $CO_2$ for cooling purposes. However, $CO_2$ is typically gaseous which limits its ability to absorb the heat of combustion.

To overcome the problems associated with using $CO_2$ as a coolant in combustion systems, water, which is inexpensive and non-toxic, has been utilized as a medium to reduce the flame temperature in several configurations. For example, one such configuration is described in WO2008/097295. In this configuration, a water-borne fuel is combusted with a gaseous fuel in a combustion turbine.

In further known configurations, for example as shown in WO2007/098239, a closed loop oxy-fuel combustion power generation cycle is disclosed. Here, oxygen and a hydrocarbon fuel are combusted to produce a gas mixture of steam and $CO_2$ that drives a turbine directly with the gas mixture. The gas mixture then enters a condenser where $CO_2$ is removed and a high pressure steam is produced that is used as a separate drive gas for a steam turbine. Because gas generators in oxy-fuel combustion power generation systems produce an exceptionally high temperature and pressure drive gas mixture (up to 5,000° F. (2,760° C.) or higher and up to 1,500 psi and higher) due to the utilization of substantially pure oxygen as the oxidizer of the hydrocarbon fuel, the prior art steam and gas turbines do not take full advantage of the high temperature oxy-fuel combustion drive gas.

In yet another configuration, as described in U.S. Pub. No. US2003/0131582, syngas produced within the gasifier is combusted within a gas generator along with oxygen from the air separator, and water is introduced into the gas generator to control the temperature of combustion of the syngas with the oxygen. Products of combustion including steam and $CO_2$ are produced within the gas generator. The combustion products are expanded through a turbine for power output and then separated, such as within a condenser.

Alternatively, U.S. Pat. No. 6,148,602 describes a configuration wherein an oxygen-fired combustor produces drive gas for a turbine. The turbine drives an air compressor and an oxygen compressor on a single shaft. And U.S. Pub. No. US2003/0233830 is directed to a configuration using an oxygen-fired combustor designed for gas turbine operating pressures. The combustor produces a high-temperature gas stream that enters one or more heat exchangers to generate/heat steam, and then enters one or more turbines to generate power. Accordingly, both configurations are limited to turbines.

Thus, while numerous configurations and methods of controlling the flame temperature are known in the art, all (or almost all of them) suffer from one or more disadvantages. One disadvantage is that, as mentioned above, these oxy-fuel configurations are limited to turbines or other expanders driven by the combustion gas mixtures and not other configurations such as boilers. It is well understood that turbines are for specific purposes and can run continuously, whereas boilers are the most commonly used method in thermal power plants. Units operate at close to atmospheric pressure, simplifying the passage of materials through the plant. Thus, the technology represented in the above configurations will not lead itself to adoption for boilers that have different operating conditions.

Another disadvantage with the aforementioned configurations is that water is introduced into the system of interest along with the fuel and oxygen. Thus, because water is not injected independently, it will be difficult to control the flame temperature in the combustion chamber. For example, WO2010/036842 provides a configuration where water/steam is injected into the combustor at various places for controlling the flame temperature. The temperature is controlled in the bulk flue gas rather than in regions such as the boundary walls of the heat exchanger. Thus, this kind of system does not provide any protection for the construction material.

Therefore, there is still a need for oxy-fuel combustion systems in configurations such as boilers and/or for improved configurations and methods of controlling flame temperature in any combustion configuration.

SUMMARY OF THE INVENTION

The present invention is directed to configurations and methods of controlling the temperature in a thermally controlled combustion system. In some aspects of the claimed invention, the combustion system comprises an oxygen inlet, a fuel inlet, and a water inlet. These inlets all lead into a combustion chamber where the fuel is combusted with the oxygen to produce a combustion gas mixture comprising $CO_2$ and steam. The water inlet is configured to inject water into the combustion chamber through one or more nozzles that are configured to produce a distributed water stream in a pattern effective to create one or more boundary layer cool zones to control the flame temperature in the combustion chamber. The combustion system further comprises an air quality control system fluidly coupled to and downstream from the combustion chamber that receives the combustion gas mixture. The air quality control system is configured to recover at least some of the injected water from the steam and to recover at least one pollutant contained in the combustion gas mixture.

In another aspect of the present invention, a method for controlling the flame temperature in a boiler system comprises introducing oxygen into the boiler system, introducing fuel into the boiler system, and injecting water into the boiler system such that the water can create a boundary layer cool zone near at least one interior wall or within a region of a combustion chamber of the boiler system. It is preferred that the water is sprayed or atomized to increase the surface area and decrease the size of water droplets.

In still another embodiment of the present invention, a method for controlling the flame temperature in a boiler system comprises introducing oxygen and water-based fuel separately into the boiler system. Furthermore, the water content in the water-based fuel is controlled such that the water content is a function of a quantity of the oxygen introduced into the boiler system and the temperature desired in the combustion system as a function of a type of fuel in the water-based fuel.

Particularly contemplated fuel sources include solid, gaseous or water-based fuel. The fuel within the water-based fuel could be any of a variety of different liquid or solid fuels. In another embodiment, the water-based fuel could be a water-containing emulsion and slurries of coke, coal, or bitumen. And particularly contemplated water sources include purified water, substantially purified water, clean water, recovered water, service water, gray water, or wastewater.

Various objects, features, aspects and advantages of the inventive subject matter will become more apparent from the following detailed description of exemplary embodiments, along with the accompanying figures in which like numerals represent like components.

DETAILED DESCRIPTION

The inventors have discovered that the combustion temperature can be effectively controlled in oxy-fuel combustion systems. Typically, contemplated systems introduce water independent of the fuel and oxygen into the combustion chamber. Most preferably, water is injected through one or more nozzles, wherein water is atomized or sprayed, thereby creating boundary layer cool zones in a boiler system.

In one aspect of the present invention, the thermally controlled combustion system comprises an oxygen inlet, a fuel inlet, and a water inlet, all of which lead into a combustion chamber where the fuel is combusted with the oxygen to produce a combustion gas mixture comprising $CO_2$ and steam. In a preferred embodiment, the water inlet is configured to inject water into the combustion chamber through one or more nozzles that are configured to produce an atomized water stream in a pattern effective to create one or more boundary layer cool zones to control the temperature in the combustion chamber, especially in the boundary areas. The combustion system further comprises an air quality control system fluidly coupled to and downstream from the combustion chamber that receives the combustion gas mixture. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The air quality control system is configured to recover at least some of the injected water from the steam and to recover at least one pollutant, which may be $CO_2$, contained in the combustion gas mixture.

As used in the description herein and throughout the claims that follow, the meaning of "a," "an," and "the" includes plural reference unless the context clearly dictates otherwise. Also, as used in the description herein, the meaning of "in" includes "into" and "on" unless the context clearly dictates otherwise.

The term "water" as used herein for injection into the combustion chamber refers to liquid or any other form of water, and combinations thereof. Water can also be purified water, substantially purified water, clean water, gray water, recovered water (collected from the combustion gas mixture), service water, and wastewater. Substantially purified water is subject to particle filtration, ion exchange treatment, pH adjustment and/or hardness removal. Clean water is typically a condensate with total dissolved solid less than 1 mg/kg, resistivity of greater than 0.1 MΩ/cm and conductivity of less than 10 μS/cm. Sources for wastewater or gray water can include cooling tower blow-down, coal pile run-off, flue gas desulfurization (FGD) blow-down, water treatment wastes, oily water waste, and sanitary drains.

The term "fuel" as used herein refers to any solid, liquid, and gaseous fuel suitable for combustion purposes. Examples include coal, lignitic coals, oil, coke, petroleum coke, anthracite, bituminous, sub-bituminous, tar, bitumen, paper mill sludge solids and sewage sludge solids, wood, peat, grass, garbage, other biomass fuels, natural gas, pure methane, sour gas, light alcohols or oxygenated hydrocarbon fuels, combinations of these fuels and water-containing emulsions and slurries of these fuels.

The term "oxygen" as used herein refers to an oxygen-containing gas with an $O_2$ concentration of greater than 22 mol %. As compared to air, which contains 20.95 mol % oxygen, higher temperatures can be reached using higher concentrations of oxygen. Approximately the same total energy is produced when burning a fuel with oxygen as compared to burning a fuel with air; the difference is the lack of temperature diluting inert gases. Sources to provide oxygen include an output of an air separation unit, a water electrolyzer, various chemical reactions, an oxygen pipeline, a pressure swing/vacuum swing operation over adsorbent beds, and/or an oxygen tank.

The term "nozzle" as used herein refers to a device that facilitates dispersion of a liquid into a spray. Nozzles are used for two purposes: to distribute a liquid over an area; and to increase liquid surface area. A wide variety of spray nozzle applications use a number of spray characteristics to describe the spray. Spray nozzles can be categorized based on the energy input used to cause atomization and the breakup of the fluid into drops. In an embodiment of the present invention, the nozzles can have one or more outlets and are a plain-orifice nozzle, shaped-orifice nozzle, or surface-impingement single-fluid nozzle. In addition, the size of nozzles may vary depending on the fluid going through the nozzles. For example, if solid absorbent is utilized during the process, the nozzle size is typically larger. In another embodiment of the present invention, a two-fluid nozzle is used when a multi fluid is utilized during the process. Here, the atomization is achieved by causing the interaction of high velocity and pressure gas and liquid. Compressed gas other than air (e.g., steam or CO2) is most often used as the atomizing gas, but sometimes steam or other gases (for example an oxygen-containing stream) are used. The many varied designs of two-fluid nozzles can be grouped into internal mix or external mix depending on the mixing point of the gas and liquid streams relative to the nozzle face. Furthermore, the material of construction for nozzles is selected based on the fluid properties of the liquid that is to be sprayed and the environment surrounding the nozzle. Spray nozzles are most commonly fabricated from metals, such as brass, stainless steel, and nickel alloys, but plastics such as PTFE and PVC and ceramics (alumina and silicon carbide) and composites are also used. Several factors must be considered, including erosive wear, chemical attack, and the effects of high temperature. Here, the flame temperature is in the range of 2,000° F. to 5,000° F. (1,093 to 2,760° C.) and thus special attention should be given to the proper choice for the nozzle material used in the process. It should be appreciated that the person of ordinary skill in the art will be readily able to select a suitable nozzle based on the operating conditions and requirements in the configurations contemplated herein and that a suitable nozzle based on the operating conditions and requirements in the configurations contemplated herein may be shielded by inert gases such as $CO_2$, combustion gases, or fluids to prevent exposure to extreme conditions.

In addition, nozzles are selected based on the desired spray pattern and other spray characteristics. Since spray nozzles are designed to perform under many different spraying conditions, more than one nozzle may meet the requirements for a given application. The nozzle could be configured with any pattern shape. Results are fairly predictable, depending on the type of spray pattern specified. The preferred nozzle is usually some type of full cone nozzle or flat fan nozzle, since the pattern will cover a larger area than many other styles. Spatial applications, in which the objective is not primarily to spray onto a surface, are more likely to require specialized spray characteristics. Success in these applications is often completely dependent on factors such as drop size and spray velocity. Evaporation, cooling rates for gases and solids, and cleaning efficiency are examples of process characteristics that may depend largely on spray qualities. Flat fan, solid cone and hollow cone spray patterns are some of the examples for spray patterns. A solid stream nozzle provides a high penetration into a combustion zone. A hollow cone spray pattern is a circular ring of liquid. The pattern is achieved by the use of an inlet orifice tangential to a cylindrical swirl chamber that is open at one end. The circular orifice exit has a diameter smaller than the swirl chamber. The whirling liquid results in a circular shape; the center of the ring is hollow. Hollow cone nozzles are best for applications requiring good atomization of liquids at low pressures or when quick heat transfer is needed. And full cone nozzles yield complete spray coverage in a round, oval or square shaped area. Usually the liquid is swirled within the nozzle and mixed with non-spinning liquid that has bypassed an internal vane. Liquid then exits through an orifice, forming a conical pattern. Spray angle and liquid distribution within the cone pattern depend on the vane design and location relative to the exit orifice. The exit orifice design and the relative geometric proportions also affect the spray angle and distribution. Full cone nozzles provide a uniform spray distribution of medium to large size drops resulting from their core design, which features large flow passages. Full cone nozzles are the style most extensively used in industry. Flat spray pattern appears as a flat sheet of liquid. The pattern is formed by an elliptical or a round orifice on a deflective surface that is tangential to the exit orifice. The orifice has an external groove with a contoured internal cylindrical radius, or "cat's eye" shape. In the elliptical orifice design, the pattern sprays out of the orifice in line with the pipe. In the deflector design, the spray pattern is perpendicular to the pipe.

There are two categories of flat spray—tapered and even—depending on the uniformity of the spray over the spray pattern. Flat spray patterns with tapering edges are produced by straight-through elliptical spray nozzles. This spray pattern is useful for overlapping patterns between multiple nozzle headers. Furthermore, atomization is achieved by adjusting the gas and liquid pressure in the spray set-up. Obtaining finer atomization is accomplished by increasing the gas pressure and/or lowering the liquid pressure, resulting in a high ratio of gas flow rate to liquid flow rate.

Figure 1:
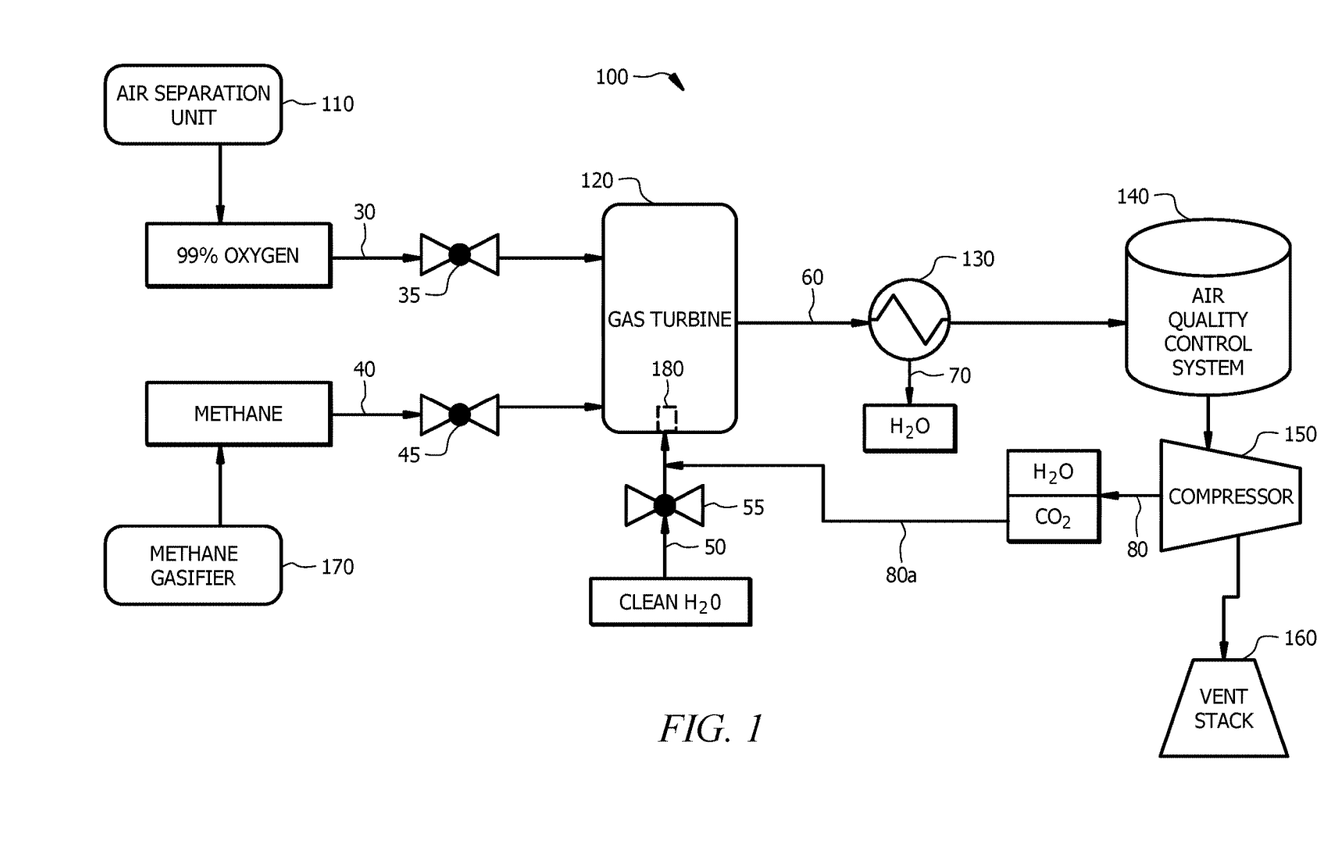
FIG. 1 is an exemplary configuration of a thermally controlled combustion system in a gas turbine according to the present invention.

An exemplary configuration is schematically depicted in FIG. 1, in which a thermally controlled combustion system 100 has a gas turbine 120 and an air quality control system 140. The gas turbine 120 is coupled to an oxygen inlet 30, which in turn is coupled to a source of oxygen. When the oxygen is supplied from an air separation unit, the oxygen also includes at least trace amounts of other gases, and typically as much as a few percent argon. Argon is a generally inert gas; it can be allowed to flow through the entire system 100.

In an embodiment, the air separation unit 110 provides 99% pure oxygen and the methane gasifier 170 provides methane. The methane gasifier is coupled to the gas turbine 120 through a fuel inlet 40. The water inlet 50 is coupled to the gas turbine 120 and delivers water into the gas turbine 120 for controlling the flame temperature in the combustion chamber (not shown) of the gas turbine 120.

Water can be purified water, substantially purified water, clean water, recovered water, service water, gray water or wastewater. In addition, "water" may include impurities or entrained materials such as suspended or dissolved solids. In a preferred embodiment of the present invention, clean water is used.

The flame temperature depends, among other factors, on the flow rate of oxygen into the combustion chamber of the gas turbine 120, the amount of water injected into the gas turbine 120, and dilution of fuel with water into the gas turbine 120. Thus, individual control valves 35, 45 and 55 are provided for the oxygen inlet 30, the fuel inlet 40 and the clean water inlet 50, respectively, wherein the respective individual valves are configured to control the flow of the oxygen, methane, and clean water. Furthermore, a flow control system (not shown) is configured to control the flow of the oxygen, fuel, and water as a function of a desired temperature. The oxygen source and fuel source are kept separate from the water source to optimize performance of the combustion chamber of the gas turbine 120. Keeping the water source separate from both the fuel and oxygen source enables one to independently inject water into the combustion chamber and hence, the flame temperature will be controlled in the combustion chamber. If the flame temperature is high, then more water is injected into the combustion chamber. Furthermore, independent water injection also provides a desired flue gas temperature that plays an important role in the application for the flue gas after exiting the combustion chamber of the gas turbine 120.

The oxygen, preferably 99% pure oxygen, is delivered into the combustion chamber of the gas turbine 120 through the oxygen inlet 30. The combustion chamber of the gas turbine 120 receives fuel from the fuel inlet 40 and oxygen from the oxygen inlet 30 to produce a combustion gas mixture of mainly $CO_2$ and steam having a temperature of about 4,500° F. (2,482° C.) and a pressure of about 100 psi to 1,500 psi. As used herein, the term "about" in conjunction with a numeral refers to a range of that numeral starting from 10% below the absolute of the numeral to 10% above the absolute of the numeral, inclusive. Preferably, the oxygen source, the fuel source and the water source are configured to provide the oxygen, methane and clean water at a pressure of about 0.5 atmosphere (ATM) to about 5 ATM.

As discussed above, the oxy-fuel combustion systems provide a higher temperature in combustion chambers. The flame temperature in the combustion chamber is usually about 2,000° F. to about 5,000° F. (1,093 to 2,760° C.), which is too high for most construction materials. Therefore, to protect the equipment utilized in the combustion system, it is necessary to inject water into these high-temperature combustion zones. This is accomplished by injecting clean water from water inlet 50 into the combustion chamber of the gas turbine 120 through one or more nozzles 180 that are configured to produce an distributed water stream in a pattern effective to create one or more boundary layer cool zones. The boundary layer cool zones are typically about 10 cm away from the interior wall of the combustion chamber of the gas turbine 120, more typically about 5 cm, more typically at least 3 or typically 1 cm. In general, the boundary layer cool zones will be a function of temperature. And the temperature is also dependent on the concentration and flow rate of oxygen and fuel used, the volume of water injected, the amount of inert gas present, and the type of fuel used in the process. For example, when a higher concentration of oxygen is used, the flame temperature will be about 4,000° F. (2,204° C.), while more water is required to be injected, thus creating a stronger cool zone that is needed to offset the adverse effects of high flame temperature. In another embodiment, if methane is used as the fuel along with only 30% oxygen or a $CO_2$ diluent is introduced, the flame temperature will be different and thus the boundary cool zone will be different. In general, the goal is to reduce the flame temperature that most construction materials (e.g., steel, stainless steel, optionally with refractory liner) can withstand.

An advantage of the independent water injection in the combustion chamber is that the flame temperature in the combustion chamber of the gas turbine 120 can be controlled independently of the type of fuel used, the firing rate, the ambient conditions, the moisture content of the fuel and the type of combustor used. For example, the thermally controlled combustion system may be configured to provide an amount of water that is effective to maintain the gas temperature at or near the wall of the combustion chamber of about 1,120° F. to about 1,170° F. (604 to 632° C.) (or below), which is a common allowable high-temperature turbine inlet temperature.

Typically, the water atomization or spray is achieved by using appropriate nozzles. In general, the spray pattern and the volume of the water injected will control the temperature gradient ($\Delta T$), the difference in the temperature near the wall of the combustion chamber, and the flame temperature in the combustion chamber. For example, the smaller droplets of water will yield a larger $\Delta T$ than if the spray system yields larger water droplets. And higher volume of water will also yield a great $\Delta T$. Two ways of creating small water droplets for spray cooling are through gas atomization and pure water atomization.

In gas atomization, pressurized gas breaks up a stream of water into fine particles. Gas atomization usually produces smaller but faster droplet sizes (around 10 to 50 micrometers and 50 to 100 m/s respectively). Clean water atomization uses forced liquid, and the internal nozzle design itself breaks up the water stream producing larger and slower particles (100 to 500 micrometers and 2 to 40 m/s). An increase in the flow rate of the water-atomizing nozzle would also produce faster cooling rates, possibly reducing the application time. Here, one or more nozzles are used with one or more outputs. As discussed above, different nozzles yield different spray patterns which in turn affect the boundary cool layer zones. In a preferred embodiment of the present invention, hollow cone nozzles are used because they are best for applications requiring good atomization of liquids at low pressures or when quick heat transfer is needed.

The water may be injected into various locations within the combustion chamber of the gas turbine 120. More typically, the water is injected near the combustion area or the entry point of the fuel or at other places with high temperature areas such as near the interior walls of the combustion chamber of the gas turbine 120. In a preferred embodiment, the water is injected near the fuel entry. The combustion gas mixture is discharged from the gas turbine 120 through the outlet 60 and enters the air quality control system 140 that is fluidly coupled to and downstream from the gas turbine 120. The air quality control system 140 is configured to recover at least some of the injected water from the steam and to recover at least one pollutant contained in the combustion gas mixture. Typically, the pollutants are $CO_2$, $NO_x$, $H_2S$ and/or $SO_x$. All pollutants may enter separate towers (not shown) for removal. Typically, NO will be removed by catalytic or non-catalytic reduction; $SO_x$ will be reacted with alkali and $CO_2$ will be absorbed in a solvent; and $H_2S$ will also be absorbed in a solvent or reagent. Any particulates exiting the combustion gas mixture will be typically removed in filters such as in a baghouse, or in electrostatic precipitators. In case of mercury, it will be removed by activated carbon or chemical oxidants. And volatile organics (VOC) in the combustion gases should be esessentially non-existent due to high combustion temperatures or controlled during combustion of the fuel, but some remaining VOC may be reduced or eliminated by plasma or other devices subject to a high energy field.

An optional heat recovery steam generator 130, located downstream from the gas turbine 120, is configured to recapture heat from the combustion gas mixture including some latent heat. The optional heat recovery steam generator 130 is usually in the form of a heat exchanger. The recovered water, exiting through outlet 70, can be utilized as a water source and injected (not shown) through the water inlet 50 into the gas turbine 120. The captured heat can replace some of the energy lost due to evaporation of water upon injection into the combustion chamber of the gas turbine 120. Alternatively, the optional steam generator 130 can heat a separate water stream (not shown) from a feedwater input. The generated steam is released through a steam output (not shown) that can be used to drive a turbine or other expanders or as process steam.

In an embodiment, the air quality control system 140 comprises a compressor 150 downstream from the air quality control system 140. Typically, the compressor 150 is configured to compress the gas mixture to an elevated pressure. The $CO_2$ stream leaves the compressor 150 via stream 80. In one embodiment, part of this $CO_2$ exits via stream 80 and goes through a recycle conduit (80a) as a motive liquid to the nozzles 180 that inject the water into the gas turbine 120. Water is recovered by separation from the $CO_2$ in the compression stages of compressor 150. This recovered water can be utilized as a water source and injected (not shown) through the water inlet 50 into the gas turbine 120.

Reduction of emission of greenhouse gases can be achieved by sequestration of isolated $CO_2$. Thus, instead of sending the remaining $CO_2$ from the combustion process to the vent stack 160, $CO_2$ can be further pressurized and injected into depleted oil wells, used in bottling, or injected into coal seams to recover coal bed methane.

Figure 2:
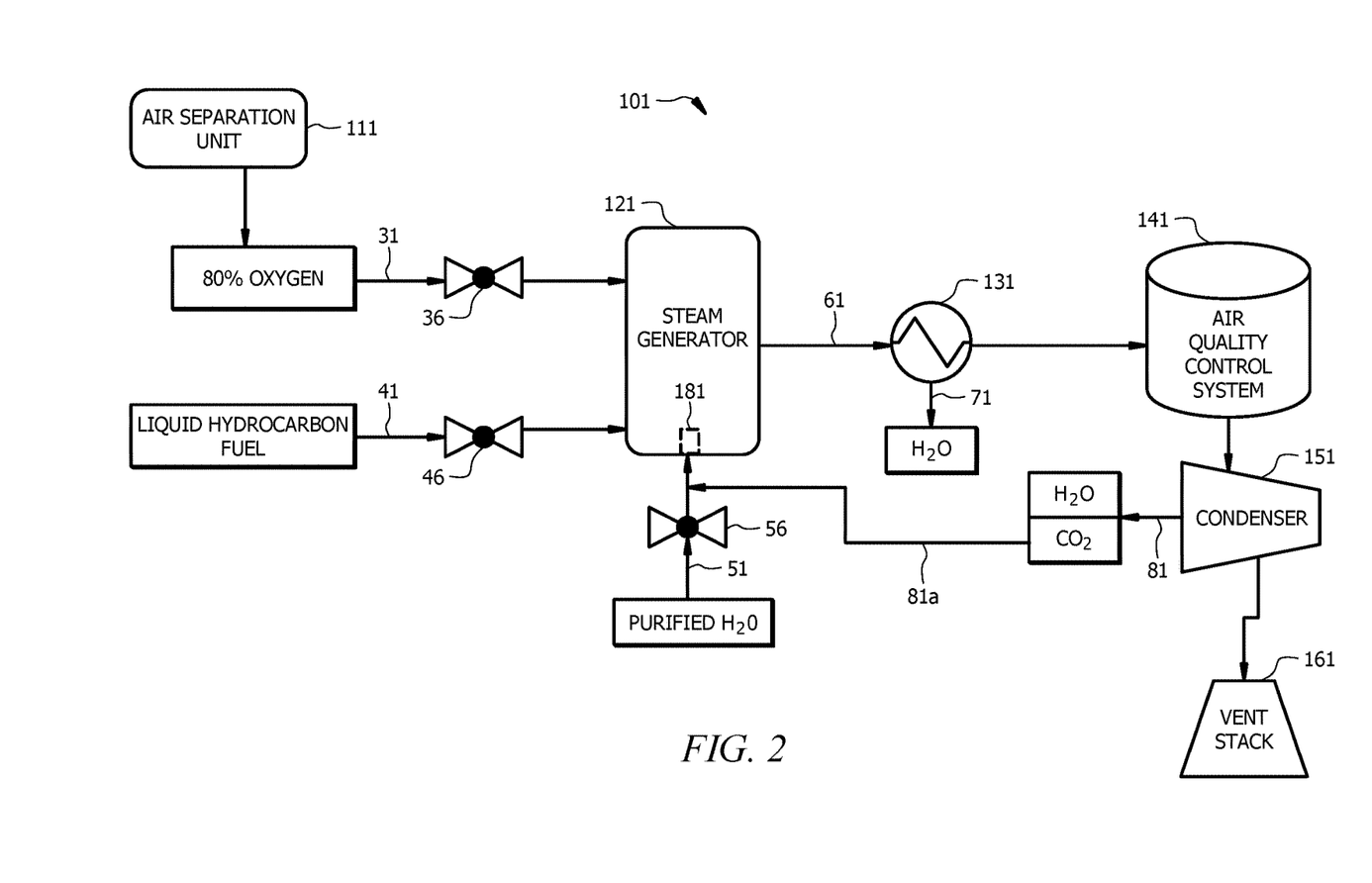
FIG. 2 is an exemplary configuration of a thermally controlled combustion system in a hydrogen generation plant with a steam generator with clean water injection according to the present invention.

Another exemplary configuration is schematically depicted in FIG. 2 that depicts a thermally controlled combustion system in a hydrogen separation plant 101 having a steam generator 121 and an air quality control system 141. The steam generator 121 is configured to combust oxygen with a liquid hydrocarbon fuel. Oxygen is supplied through an oxygen inlet 31. In a preferred embodiment, the oxygen is supplied through an air separation unit 111 that provides at least 80% pure oxygen.

The steam generator 121 is also coupled to a source of liquid hydrocarbon fuel through a fuel inlet 41. The water inlet 51 is coupled to the steam generator 121 and delivers water into the steam generator 121 for controlling the temperature in the steam generator 121. Water can be purified water, substantially purified water, clean water, recovered water, service water, gray water or wastewater. In a preferred embodiment, purified water is used.

As discussed above, the flame temperature depends, among other factors, on the flow rate of oxygen into the steam generator 121, the amount of water injected into the steam generator 121 and dilution of fuel with water in the steam generator 121. Thus, individual control valves 36, 46 and 56 are provided for the oxygen inlet 31, the fuel inlet 41 and the water inlet 51, respectively, wherein the respective individual valves are configured to control the flow of oxygen, liquid hydrocarbon fuel, and purified water. Furthermore, a flow control system (not shown) is configured to control the flow of oxygen, fuel, and water as a function of a desired temperature. The oxygen is delivered into the steam generator 121 through the oxygen inlet 31. The steam generator 121 receives liquid hydrocarbon from the fuel inlet 41 and oxygen from the oxygen inlet 31 to produce a combustion gas mixture of mainly $CO_2$ and steam having a temperature of about 1,800° F. to 3,000° F. (982-1649° C.) and a pressure of about 90 psi to 100 psi. Preferably, the oxygen source, the fuel source and the purified water source are configured to provide the oxygen, liquid hydrocarbon fuel and water at a pressure of about 1 ATM to about 3 ATM.

As discussed above, to protect the equipment utilized in a combustion system, it is necessary to inject water into these high-temperature combustion zones. This is accomplished by injecting purified water from water inlet 51 into the steam generator 121 through one or more nozzles 181 that are configured to produce a distributed water stream in a pattern effective to create one or more boundary layer cool zones. Since a lower concentration of oxygen is used in this process (80%), for example compared to the system in FIG. 1 (99%), the flame temperature is lower than that of the system in FIG. 1, for example 3,000° F. (1,093° C.). Thus, the boundary layer cool zone will be different for this system than the system FIG. 1. Consequently, the amount of water required to reduce the temperature will be lower than the amount of water required in the system in FIG. 1. In another embodiment, the boundary layer cool zones are typically about 8 cm away from the interior wall of the steam generator 121, more typically about 4 cm, more typically at least 1 cm. in general, the boundary layer cool zones will be a function of temperature.

Steam produced in the steam generator 121 can be used as process steam or in an expander to provide work to drive a turbine.

As discussed above, the spray pattern affects the boundary layer cool zone, which in turn affects the flame temperature. In a preferred embodiment of the present invention, a solid stream nozzle is used since it provides a high impact per unit area and thus yields a more effective spray pattern resulting in a more controlled flame temperature. In another embodiment, water is sprayed. In another embodiment, the thermally controlled hydrogen separation plant system 101 is configured to provide an amount of water that is effective to maintain the flame temperature such that most of material of construction can withstand the associated heat. Regardless of the particular nozzle and spray pattern, it is generally preferred that the spray will not wet the walls of the interior walls of the steam generator/combustion chamber.

The combustion gas mixture is discharged from the steam generator 121 through the outlet 61 and enters the air quality control system 141 that is fluidly coupled to and downstream from the steam generator 121. The air quality control system 141 is configured to recover at least some of the injected water from the steam and to recover at least one pollutant contained in the combustion gas mixture. Typically, the pollutants are $CO_2$, $NO_x$, $H_2S$, $SO_2$ and/or ash. As previously discussed, the pollutants will be removed in separate towers.

An optional heat exchanger 131, located downstream from the steam generator 121, is configured to condense the steam from the combustion gas mixture and to recover some latent heat from the combustion gas mixture. The recovered water, exiting through outlet 71, can be utilized as a water source and injected (not shown) through the water inlet 51 into the steam generator 121. The captured heat can replace some of the energy lost due to evaporation of water upon injection into the steam generator 121.

In an embodiment, the air quality control system 141 comprises a condenser 151 downstream from the air quality control system 141. The condenser further cools the gas mixture exiting the air quality control system 141, causing steam within the gas mixture to condense into a liquid. A gas outlet stream 81 removes $CO_2$ and any other gases from the condenser 151 for recovery of the $CO_2$ and sequestration of the $CO_2$ away from the atmosphere. Thus, instead of entering the vent stack 161, remaining $CO_2$ can be further pressurized and injected into depleted oil wells or used in bottling. The liquid from the condenser can be pressurized at a pump (not shown) and returned to the steam generator 121.

In one embodiment, part of this $CO_2$ exits stream 81 and goes through a recycle conduit (81a) as a motive liquid to the nozzles 181 that inject the water into the steam generator 121.

Figure 3:
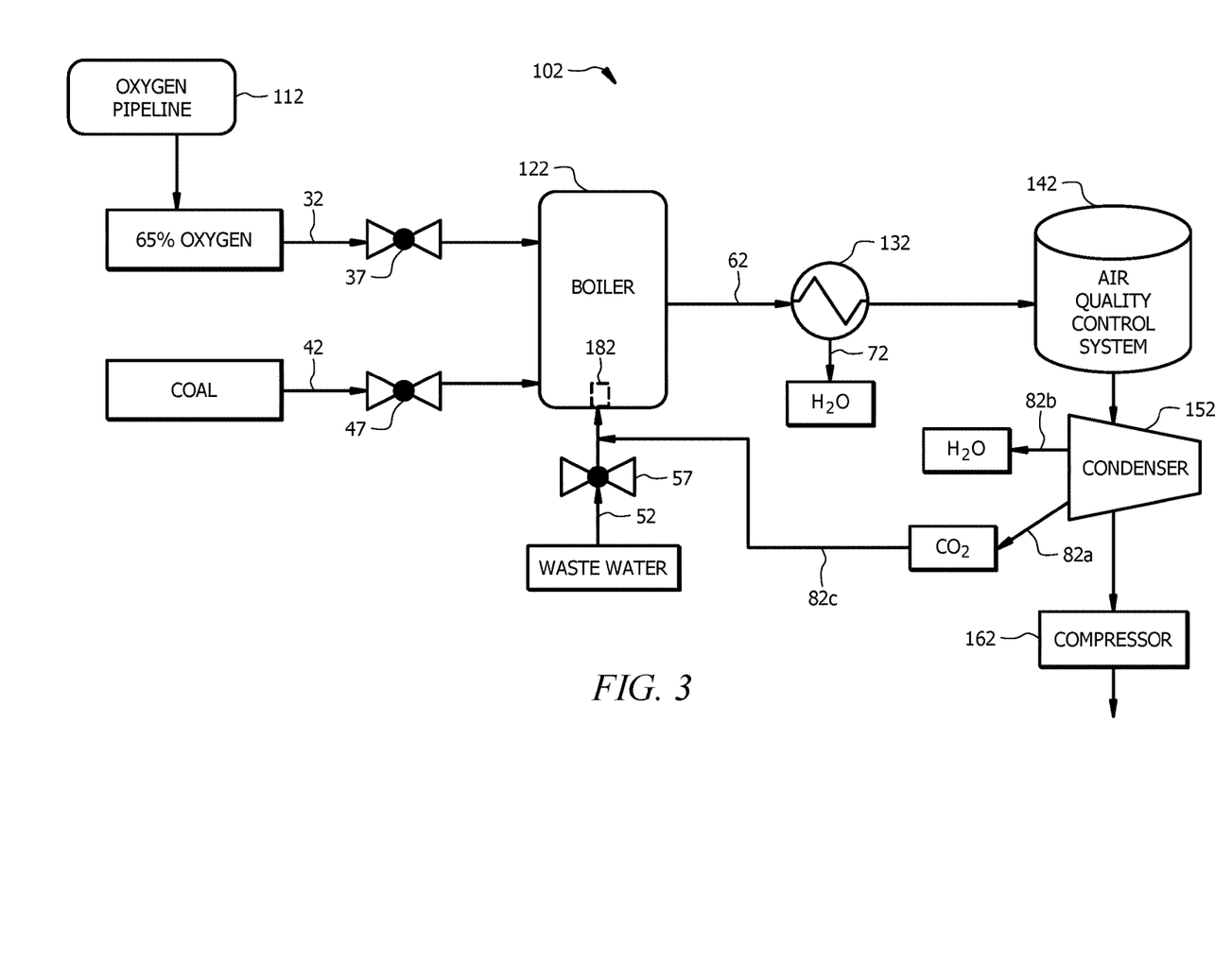
FIG. 3 is an exemplary configuration of a thermally controlled combustion system in a mining operation plant with wastewater injection according to the present invention.

Another exemplary configuration is schematically depicted in FIG. 3. This embodiment is similar to the combustion cycle 101 of the embodiment in FIG. 2, except as particularly described herein. FIG. 3 depicts a steam generation plant in a mining operation 102 having a boiler 122 and an air quality control system 142. The boiler 122 is coupled to an oxygen inlet 32, which in turn is coupled to a source of oxygen. Here, an oxygen pipeline 112 provides about 65% pure oxygen. The boiler 122 is coupled to a source of coal through the fuel inlet 42. The wastewater inlet 52 is coupled to the boiler 122 and delivers wastewater into the boiler 122 for controlling the flame temperature in the boiler 122. Sources for wastewater or gray water can include cooling tower blow-down, coal pile runoff, flue gas desulfurization (FGD) blow-down, water treatment wastes, oily water waste and sanitary drains.

Steam produced by the boiler 122 or heat exchanger 132 an be used as process steam or in an expander to provide work to drive a turbine.

As discussed above, the flame temperature depends, among other factors, on the flow rate of the oxygen into the boiler 122, the amount of wastewater injected into the boiler 122 and the dilution of fuel with water into boiler 122. Thus, individual control valves 37, 47 and 57 are provided for the oxygen inlet 32, the fuel inlet 42 and the wastewater inlet 52, respectively, wherein the respective individual valves are configured to control the flow of oxygen, fuel, and wastewater. Furthermore, a flow control system (not shown) is configured to control the flow of oxygen, fuel, and wastewater as a function of a desired temperature. The oxygen source and fuel source are kept separate from the wastewater source in order to optimize performance of the steam generation plant 102. As discussed above, separation of wastewater source provides independent water injection via spray or atomization. This system allows for independent control of the water with a less complicated boiler, since the water source is not a component of the boiler. And since water is injected to control the temperature, the independent water injection will result in a control mechanism that is independent of most parameters in the combustion process, such as the fuel rate, the moisture content of the fuel, and the firing rate. It should be noted that higher concentration of oxygen results in higher flame temperature, and thus controlling/reducing the flame temperature will require a higher volume of wastewater injected into the boiler where the combustion between the coal and oxygen occurs.

The oxygen, preferably at least 65% pure, is delivered into the boiler 122 through the oxygen inlet 32. The boiler 122 receives coal through the fuel inlet 42 and oxygen from the oxygen inlet 32 to produce a combustion gas mixture of mainly $CO_2$ and steam having a temperature of about 1,500° F. to 2,200° F. (815-1,204° C.) and a pressure of about atmospheric or in the case of pressure firing about 80 psi to 110 psi. Preferably, the oxygen source, the fuel source and the wastewater source are configured to provide the oxygen, coal and wastewater at a pressure of about 0.5 ATM to about 3 ATM. Since oxygen is utilized to combust the coal, nitrogen in the flue gas is reduced or eliminated, in contrast to an air/coal combustion system. Thus, most or all of the nitrogen can be eliminated from the system resulting in flue gas having a high concentration of $CO_2$ product.

As discussed above, to protect the equipment utilized in a combustion system, it is necessary to inject water into these high-temperature combustion zones. This is accomplished by injecting wastewater from wastewater inlet 52 into the boiler 122 through one or more nozzles 182 that are configured to produce an atomized wastewater stream in a pattern effective to create one or more boundary layer cool zones. One advantage of this independent wastewater injection is that the flame temperature in the boiler 122 can be controlled independently of the type of fuel used, the firing rate, the ambient conditions, the moisture content of the fuel and the type of combustor used. In an embodiment, the thermally controlled boiler system is configured to provide an amount of wastewater that is effective to maintain the flame temperature such that most of the construction material, such as steel, can withstand the associated heat.

As previously discussed, the wastewater is typically atomized or sprayed by using appropriate nozzles. In a preferred embodiment, a full cone nozzle is used to spray water, since its pattern will cover a larger area than the other styles and thus a more uniform boundary cool layer is created. In one embodiment, one or more nozzles are used with one or more outputs. Wastewater may be injected into various locations within the boiler 122. More typically, the wastewater is injected near the combustion area or the fuel entry point.

Since a lower concentration of oxygen (65%) is used in this process, for example, compared to the one in the system of FIG. 2 (80%), the flame temperature is lower than that of the system in FIG. 2, for example 2,200° F. (1,204° C.). Thus, the boundary layer cool zone will be different for this system than the system in FIG. 2. Consequently, the amount of water required to reduce the temperature will be lower than the amount of water required in the system of FIG. 2. In an embodiment, the boundary layer cool zones are typically about 6 cm away from the interior wall of the boiler 122, more typically about 4 cm, or more typically at least 2 cm.

The combustion gas mixture is discharged from the boiler 122 through the outlet 62 and enters the air quality control system 142 that is fluidly coupled to and downstream from the boiler 122. The air quality control system 142 is configured to recover at least some of the injected wastewater from the steam and to recover at least one pollutant contained in the combustion gas mixture. As discussed above, the typical pollutants are $CO_2$, $NO_x$, $SO_2$, $H_2S$, and/or ash. The air quality control system 142 is also configured to purify the wastewater introduced into the boiler 122 through inlet 52. Here, since coal is the fuel used in the process, and since impurities in the wastewater or gray water are present, the air quality control system may comprise one or more of a selective catalytic $NO_x$ reduction, a flue gas desulfurization unit, a dry absorbent injection unit, an activated carbon injection unit, and a particulate control unit (e.g., by wet or dry electrostatic precipitators or fabric filters). In an embodiment, the recovered water from optional heat exchanger 132 and the condenser 152 is a purified water since components of the wastewater have been removed in the process and in the air quality control system 142. Some uses for the purified water may include FGD make-up, seal water, cooling water, service water, and cooling water make-up. In some cases, after minimal treatment, the purified water could be used as boiler feed water, soda water, and potable water.

An optional heat exchanger 132, located downstream from the boiler 122, is configured to condense the steam from the combustion gas mixture and to recover some latent heat from the combustion gas mixture. The recovered wastewater, exiting through outlet 72, can be utilized as a wastewater source and injected (not shown) through the wastewater inlet 52 into the boiler 122. The captured heat can replace some of the energy lost due to evaporation of wastewater upon injection into the boiler 122.

In an embodiment, the air quality control system 142 comprises a condenser 152 downstream from the air quality control system 142. Typically, the condenser 152 is configured to separate the gas mixture into a primarily steam component and a primarily $CO_2$ component. The $CO_2$ stream leaves the condenser 152 via a gas outlet 82a. The water is discharged through a liquid outlet 82b. A $CO_2$ compressor 162 can be provided to pressurize $CO_2$ gas for further handling and optional sequestration from the atmosphere. In one embodiment, part of this $CO_2$ exits the outlet 82a and goes through a recycle conduit (82c) as a motive liquid to the nozzles 182 that inject the wastewater into the boiler 122.

Figure 4:
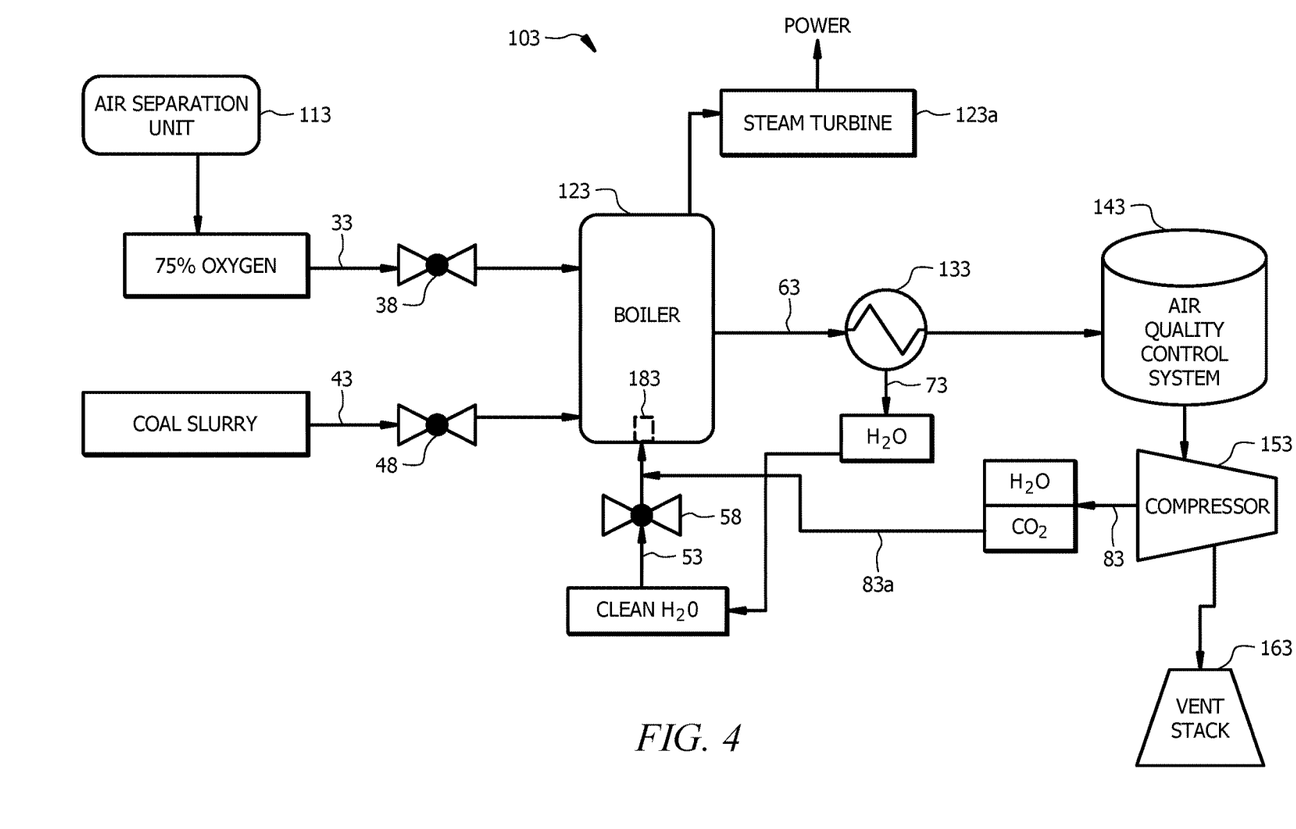
FIG. 4 is an exemplary configuration of a thermally controlled combustion system in a power plant with water-based fuel injection according to the present invention.

A fourth exemplary configuration is schematically depicted in FIG. 4 in which a coal power plant system 103 has a boiler 123 and an air quality control system 143. The boiler 123 is coupled to an oxygen inlet 33, which in turn is coupled to a source of oxygen. In an embodiment, the air separation unit 113 provides about 75% pure oxygen. A water-based fuel inlet 43 is also coupled to the boiler 123. The water inlet 53 is coupled to the boiler 123 and delivers water into the boiler 123 for controlling the flame temperature in the boiler 123.

In this example, the fuel is a water-based fuel. Here, the fuel within the water-based fuel could be any of a variety of different liquid or solid fuels. In an embodiment, the water-based fuel could be a water-containing emulsion and slurries of coke, coal, or bitumen. In a preferred embodiment, the water-based fuel is coal slurry. Coal slurry is then delivered through fuel inlet 43 into the boiler 123. As discussed above, water-based fuel provides several advantages in oxy-fuel systems. The water in the fuel is used to control the flame temperature. The amount of water can be adjusted to control the temperature by increasing or decreasing the amount of water contained in the fuel and/or adding water through independent locations. Extra water can optionally be added by spraying through nozzles or atomization through the water inlet 53. Even though the fuel contains water, due to the high temperature in the combustion chamber, most of the fuel will be converted to $CO_2$. Another advantage in using water-based fuel is the reduction of soot formation, reduction of boiler slagging and reduction of formation of $NO_x$.

Water can be purified water, substantially purified water, clean water, gray water and wastewater. Consequently, if wastewater or gray water is utilized in the process, the wastewater is delivered into the boiler 123 through water inlet 53. In a preferred embodiment, clean water is utilized.

As discussed above, the flame temperature depends, among other factors, on the flow rate of oxygen into the boiler 123, the amount of water injected into the boiler 123 and dilution of fuel with water in the boiler 123. Thus, individual control valves 38, 48 and 58 are provided for the oxygen inlet 33, the coal slurry inlet 43 and the water inlet 53, respectively, wherein the respective individual valves are configured to control the flow of oxygen, coal slurry, and clean water. Furthermore, a flow control system (not shown) is configured to control the flow of oxygen, coal slurry, and clean water as a function of a desired temperature.

The oxygen, preferably 75% pure oxygen, is delivered into the boiler 123 through the oxygen inlet 33. The boiler 123 receives coal slurry from the water-based fuel inlet 43 and oxygen from the oxygen inlet 33 to produce a combustion gas mixture of mainly $CO_2$ and steam having a temperature of about 1,800° F. to 2,800° F. (982-1,538° C.) and a pressure of about atmospheric or in the case of pressure firing 70 psi to 90 psi. Preferably, the oxygen source, the water-based fuel source and the water source are configured to provide the oxygen, coal slurry and water at a pressure of about 1 ATM to about 2.5 ATM.

As discussed above, the oxy-fuel combustion systems provide a higher temperature in combustion chambers. The flame temperature in the combustion chamber is usually about 2,500° F. to 5,000° F. (1,371-2,760° C.), which is too high for most construction materials. Therefore, to protect the equipment utilized in the combustion system, it is necessary to inject water into these high-temperature combustion zones. Here, by using water-based fuel, this is accomplished by controlling the water contained in the fuel. The content of water is controlled in the water-based fuel such that the water content is a function of a quantity of the oxygen introduced into the boiler 123 and as a function of a type of fuel in the water-based fuel. Furthermore, optional water can be injected water from water inlet 53 into the boiler 123 through one or more nozzles 183 that are configured to produce an atomized water stream in a pattern effective to create one or more boundary layer cool zones. An advantage of this independent water injection is that the flame temperature in the boiler 123 can be controlled independently of the type of fuel used, the firing rate, the ambient conditions, the moisture content of the fuel and the type of combustor used. In an embodiment, the flame temperature is controlled at least in part by controlling water in the water-based fuel such that material of construction, for example steel, can withstand the associated heat.

As discussed above, the optional water is typically atomized or sprayed where appropriate nozzles or when suitable methods are utilized. In a preferred embodiment of the present invention, hollow cone nozzles are used since they are best for applications requiring good atomization of liquids at low pressures. In another embodiment, one or more nozzles are used with one or more outputs. Optional water may be injected into various locations within the boiler 123. More typically, the optional water is injected near the combustion area or the water-based fuel entry point or near the interior wall of the combustion chamber.

Since a lower concentration of oxygen is used in this process (75%), for example compared to the system in FIG. 2 (80%), the flame temperature is lower than that of the system in FIG. 2, for example 2,800° F. (1,538° C.). Thus, the boundary layer cool zone will be different for this system than the system in FIG. 2. Consequently, the amount of water required to reduce the temperature will be lower than the amount of water required in the system in FIG. 2. In another embodiment, the boundary layer cool zones are typically about 8 cm away from the interior wall of the boiler 123, more typically about 4 cm, or more typically at least 1 cm. In general, the boundary layer cool zones will be a function of temperature.

The combustion gas mixture is discharged from the boiler 123 through the outlet 63 and enters the air quality control system 143 that is fluidly coupled to and downstream from the boiler 123. The air quality control system 143 is configured to recover at least some of the water in the water-based fuel or optional injected water from the steam and to recover at least one pollutant contained in the combustion gas mixture. As discussed above, typically, the pollutants are $CO_2$, $NO_x$, $H_2S$, $SO_2$ and/or ash, which will be removed in separate towers.

An optional heat exchanger 133, located downstream from the boiler 123, is configured to condense the steam from the combustion gas mixture and to recover some latent heat from the combustion gas mixture. The recovered water, exiting through outlet 73, can be utilized as a water source and injected through the water inlet 53 into the boiler 123. The captured heat can replace some of the energy lost due to evaporation of the water in the water-based fuel or the optional water upon injection into the boiler 123. In a preferred embodiment, the steam generated in the boiler 123 will enter a steam turbine 123a, where the steam is expanded and power is extracted.

In an embodiment, the air quality control system 143 comprises a compressor 153 downstream from the air quality control system 143. Typically, the compressor 153 is configured to compress the gas mixture to an elevated pressure. The $CO_2$ stream leaves the compressor 153 via stream 83. In one embodiment, part of this $CO_2$ exits via stream 83 and goes through a recycle conduit (83a) as a motive liquid to the nozzles 183 to assist with injection of the optional water into the boiler 123. As discussed above, to reduce the emission of greenhouse gases, the $CO_2$ can be sequestered away from the atmosphere. Thus, instead of sending the remaining $CO_2$ from the combustion process to the vent stack 163, $CO_2$ can be further pressurized and injected into depleted oil wells or used in bottling.

Thus, specific embodiments of a thermally controlled combustion system and methods to control such systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein, is inconsistent or contrary to the definition of that term provided herein, the definition of that term provided herein applies and the definition of that term in the reference does not apply.

What is claimed is:

1. A thermally controlled combustion system comprising:
   (i) a combustion chamber having an oxygen inlet, a fuel inlet, and a liquid water inlet;
   (ii) an air quality control system fluidly coupled to and downstream from the combustion chamber;
   wherein the water inlet is configured to inject water into the combustion chamber through one or more nozzles that are configured to produce a distributed water stream in a pattern effective to create one or more boundary layer cool zones to control the flame temperature in the combustion chamber;
   wherein the air quality control system receives a combustion gas mixture comprising $CO_2$ and steam from the combustion chamber; and
   wherein the air quality control system comprises a compressor to recover the $CO_2$ and at least some of the injected water from the steam; and
   (iii) wherein part of the recovered $CO_2$ leaves the compressor as a motive liquid for the liquid water and flows through a recycle conduit to the one or more nozzles.

2. The thermally controlled combustion system according to claim 1, wherein the at least some of the injected water is recovered by separation from the $CO_2$ in the compression stages of the compressor.

3. The thermally controlled combustion system according to claim 2, wherein the injected water recovered by the compressor is recycled into the combustion chamber through the water inlet.

4. The thermally controlled combustion system according to claim 1, wherein the fuel is water-based fuel.

5. The thermally controlled combustion system according to claim 4, wherein the water-based fuel is selected from water-containing emulsion and slurries of coke, coal, or bitumen.

6. The thermally controlled combustion system according to claim 1, wherein the thermally controlled combustion system is configured to provide an amount of water that is effective to maintain the flame temperature of about 800° C. to about 1,200° C.

7. The thermally controlled combustion system according to claim 1, further comprising an oxygen source, a fuel source, and a water source, wherein each of the oxygen source, the fuel source, and the water source is configured to provide the oxygen, fuel, and water at a pressure of about 1.5 ATMs to about 40 ATMs.

8. The thermally controlled combustion system according to claim 1, wherein the water is selected from recovered water, gray water, and wastewater.

9. The thermally controlled combustion system according to claim 1, wherein the thermally controlled combustion system further comprises a heat exchanger downstream from the combustion chamber and wherein the heat exchanger is configured to receive the combustion gas mixture and to recover some latent heat from the combustion gas mixture.

10. The them ally controlled combustion system according to claim 9, wherein the heat exchanger is configured to condense the steam from the combustion gas mixture.

11. The thermally controlled combustion system according to claim 1, wherein the air quality control system is configured to withdraw purified water.

12. The thermally controlled combustion system according to claim 1, wherein the inlets for oxygen, fuel, and water comprise respective individual valves that are configured to control flow of the oxygen, fuel, and water, and a flow control system configured to control flow of the oxygen, fuel, and water as a function of a desired temperature.

* * * * *

UNITED STATES PATENT AND TRADEMARK OFFICE
CERTIFICATE OF CORRECTION

PATENT NO. : 9,709,271 B2
APPLICATION NO. : 13/772125
DATED : July 18, 2017
INVENTOR(S) : Dennis W. Johnson et al.

It is certified that error appears in the above-identified patent and that said Letters Patent is hereby corrected as shown below:

In the Claims

Column 16, Line 46: "them ally" should be "thermally"

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*